United States Patent
Voges et al.

[11] B 3,925,378
[45] Dec. 9, 1975

[54] TETRAALKYL PYRAZINES FROM ALKANOLAMINES BY COPPER-CHROMITE CATALYSIS

[75] Inventors: Heinz-Werner Voges; Josef Ewers, both of Dorsten, Germany

[73] Assignee: Veba-Chemie Aktiengesellschaft, Gelsenkirchen-Buer, Germany

[22] Filed: Aug. 11, 1972

[21] Appl. No.: 280,015

[44] Published under the Trial Voluntary Protest Program on January 28, 1975 as document no. B 280,015.

[30] Foreign Application Priority Data
Aug. 13, 1971  Germany.............................. 2140649

[52] U.S. Cl............................................. 260/250 B
[51] Int. Cl.²........................................ C07D 241/12
[58] Field of Search ................................ 260/250 B

[56] References Cited
UNITED STATES PATENTS
2,813,869  11/1957  Langdon............................ 260/268

*Primary Examiner*—Raymond V. Rush
*Attorney, Agent, or Firm*—Burgess, Dinklage & Sprung

[57] ABSTRACT

2,3,5,6-tetraalkylpyrazines having the formula

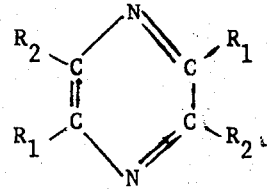

from 1,2-dialkylmonoethanolamines having the formula

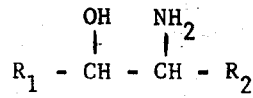

wherein $R_1$ and $R_2$ represent identical or different alkyl radicals of low molecular weight, such as methyl, ethyl, propyl and/or butyl, which may be joined together in a ring, by dehydrogenating and dehydrating cyclization of the amines on copper-chromite catalysts at 200° to 300° C. The reaction is carried out in the presence of 1 to 20 moles of ammonia per mole of 1,2-dialkylmonoethanolamine and in the presence of 0.1 to 20 moles of water vapor per mole of 1,2-dialkylmonoethanolamine.

4 Claims, No Drawings

TETRAALKYL PYRAZINES FROM ALKANOLAMINES BY COPPER-CHROMITE CATALYSIS

BACKGROUND

This invention relates to a catalytic process for the manufacture of 2,3,5,6-tetraalkyl pyrazines by the dehydrogenating and dehydrating cyclization of 1,2-dialkylmonoethanolamines. The process can be illustrated by the following reaction scheme:

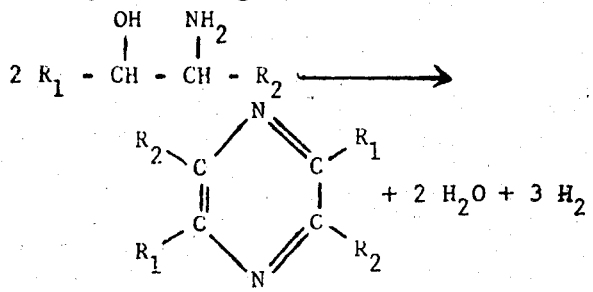

wherein $R_1$ and $R_2$ represent identical or different alkyl radicals of low molecular weight, namely methyl, ethyl, propyl or butyl. $R_1$ and $R_2$ may also be linked to one another so that cyclic alkanolamines may also be used as starting materials.

The synthesis of di-, tri- or tetraalkylated pyrazines by the dehydrogenating and dehydrating catalytic cyclization of alkanolamines is known. For example, U.S. Pat. Nos. 2,813,869 and 3,067,199 describe a process for preparing 2,5-dimethylpyrazine from 1-amino-2-propanol, although always with admixtures of the corresponding piperazine.

This process involves passing preheated 1-amino-2-propanol vapors at atmospheric pressure through a nickel or copper chromite catalyst heated to 200° to 270° C, whereupon the formation of pyrazine takes place. The vapors leaving the reactor are chilled until the 2,5-dimethylpyrazine is condensed, and finally the desired product is isolated from the condensate by an azeotropic distillation with water (steam distillation). In this manner, yields of 65% 2,5-dimethylpyrazine are obtained, with reference to the reacted 1-amino-2-propanol.

If it is desired to deliberately prepare tetraalkylpyrazine from 1,2-dialkylmonoethanolamine by this process, very unsatisfactory yields are obtained.

If, for example, butanolamine vapor, or a mixture of butanolamine vapor and steam, is passed at 200° to 275° C through a copper chromite catalyst, even at catalyst loadings of less than 0.5 g of butanolamine per g of catalyst per hour, never can tetramethylpyrazine yields greater than 25% be obtained, even though virtually all of the starting material has reacted.

The synthesis of tetraalkylpyrazine by this method is also completely unsatisfactory as is shown by the fact that part of the amine nitrogen of the starting material is split off on the catalyst and is found as gaseous ammonia in the discharge from the reactor, and that large amounts of a great variety of by-products are formed. Some of these by-products have such a great tendency towards discoloration, resin formation and contaminate the desired pyrazine to such an extent that the purification process that follows becomes very difficult.

A small portion of the by-products, on account of their low volatility, tend to precipitate in solid form on colder parts of the reactor and clog the passages. For example, one substance having a melting temperature of 253° C, which has been identified as 2,5,6-trimethyl-3-hydroxypyridine of the following formula

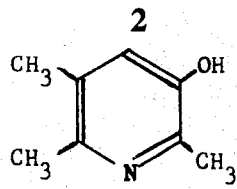

deposits itself in crystalline form in the catalyst chamber when butanolamine vapors are passed through a copper chromite catalyst according to the prior-art process.

The problem thus existed of developing a vapor-phase process which also permitted the transformation of dialkylmonoethylanolamines deliberately to tetraalkylpyrazines without the disadvantages of the known processes, which occur when these materials are used, such as diminished pyrazine yield, clogging of passages in the reactor by by-products of low volatility, and difficulty in purifying the crude pyrazine.

SUMMARY

It has surprisingly now been found that tetraalkylpyrazines can be produced in high yields and with the virtually complete reaction of the dialkylmonoethanolamines by:
  a. Performing the catalytic dehydrogenating and dehydrating cyclization between 200° and 300° C in the presence of 1 to 20 moles of ammonia per mole of dialkylmonoethanolamine;
  b. Mixing an inert gaseous or vaporous diluent, such as steam for example, into the mixture of dialkylmonoethanolamine vapor and ammonia;
  c. Using special catalyst combinations of copper and chromium oxide on an aluminum oxide and/or silicon dioxide support;
  d. Maintaining catalyst loadings of 0.1 to 0.5 g of dialkylmonoethanolamine per gram of catalyst per hour.

The subject of the invention, therefore, is a process for the manufacture of 2,3,5,6-tetraalkylpyrazines having the formula

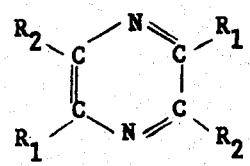

from 1,2-dialkylmonoethanolamines having the formula

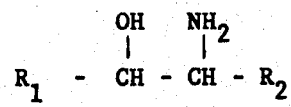

wherein R1 and $R_2$ represent identical or different $C_{1-4}$ alkyl radicals of low molecular weight, such as methyl, ethyl, propyl and/or butyl, which may be joined to one another to form a ring, through dehydrogenating and dehydrating cyclization on copper chromite catalysts at 200° to 300° C. The reaction is carried out in the presence of 1 to 20 moles of ammonia per mole of 1,2-dialkylmonoethanolamine and in the presence of 0.1 to 20 preferably 0.5 to 10 moles of water vapor per mole of 1,2-dialkylmonoethanolamine using a catalyst containing 5–50 wt/% copper, especially 10–25 wt/%, and 1–10 wt/% chromium, especially 2–5 wt/%, and an aluminum oxide and/or silicon dioxide support.

DESCRIPTION

Essential to the achievement of the aims of this invention is the thorough mixing of the dialkylethanolamine vapors entering the catalyst chamber with the gaseous ammonia. Dialkylmonoethanolamines are liquid or solid at room temperature, but they are relatively low-melting compounds. Furthermore, they are very easily soluble in water. It is therefore possible to proceed by pumping on the one hand gaseous ammonia, plus, if desired, water or steam, and on the other hand the liquid or melted dialkylmonoethanolamine, into vaporizer-preheater which is heated above the boiling point of the dialkylethanolamine and is connected to the input of the catalyst chamber, so that the dialkylethanolamine is immediately vaporized and mixes with ammonia and water. More conveniently, the dialkylmonoethanolamine may also be dissolved in a certain desired quantity of aqueous ammonia solution and this mixture may be pumped into the vaporizer-preheater.

Accordingly, a number of possible starting materials for the process of the invention are, for example:

1,2-dimethylmonoethanolamine (hereinafter called butanolamine);

1-methyl-2-ethylmonoethanolamine and
1-ethyl-2-methylmonoethanolamine (hereinafter both called pentanol-amine;

1,2-diethylmonoethanolamine (hereinafter called hexanolamine);

2-hydroxy-cyclohexylamine (hereinafter called cyclohexanolamine);
and the like.

The starting substances named above, and others like them, may be obtained, for example, by epoxidizing the fundamental olefins of equal carbon number, and then reacting the epoxides with ammonia.

The use of steam as an inert diluent presents two additional advantages for the process of the invention, these being based on the fact that, on the one hand, pyrazines volatilize with water vapor far below their normal boiling points, and that on the other hand pyrazines form crystalline hydrates with water, which nevertheless melt even at less than 100° C. The steam volatility brings it about that the catalyst surfaces are kept free of pyrazine deposits which diminish their activity. The formation of low-melting hydrates brings it about that no solid products, which might clog the passages, form in the cooling and condensing part of the apparatus at temperatures just below 100° C.

In the copper and chrome-containing supported catalysts, the copper content amounts to 10 to 25 wt/% and the chromium content amounts to 2 to 5 wt/%, while the aluminum oxide and/or silicon dioxide supporting material make up the balance. Theoretically, copper-chromium catalysts containing barium oxide, zinc oxide and/or sodium oxide may also be used; however, when the last-named catalysts are used, the percentage of high-melting by-products of the 2,5,6-trimethyl-3-hydroxypyridine type in the desired pyrazine increases considerably, resulting in the loss of one advantage of the process, namely the production of a tetraalkylpyrazine that is free of by-products that are difficult to separate.

Catalyst loadings most favorable for the purpose of the invention have proven to be within the limits of 0.1 to 0.5 g of dialkylmonoethanolamine per g of catalyst per hour, each mole of dialkylethanolamine being accompanied by 1 to 20 moles of ammonia and, advantageously, as described above, by additional quantities of water vapor. The stated loading range is to be interpreted to mean that, at low reaction temperature, the catalyst loading must be kept relatively low, at 0.1 g/g/h, and at higher reaction temperature it may be increased to 0.5 g/g/h without appreciably detracting from the virtually complete reaction of the dialkylmonoethanolamine, which is considered as one of the aims of the invention.

The following examples aid in understanding the invention without limiting same in any manner.

EXAMPLE 1

Synthesis of 2,3,5,6-tetramethylpyrazine from 1,2-dimethylmonoethanolamine (butanolamine).

A copper-chromite supported catalyst containing 24 wt/% Cu and 2wt/% Cr on 74 wt/% $Al_2O_3$ support was used. 102 g of this catalyst, which had been ground to a grain size of 0.5 to 1 mm, occupied a bulk volume of 127 $cm^3$ and had a free bulk of 98 $cm^3$, was located in a quartz glass tube 1 m long and 2 cm in diameter serving as the reactor. The reactor, which could be heated to any desired temperature by an external electrical heating jacket, was connected at the product input side to a likewise electrically heated vaporizer-preheater and at the product output side to a two-stage condensing-cooling system. The first cooling stage consisted of a coil condenser maintained by hot water at 85° to 100° C, and the second of a large-capacity product receiving vessel maintained at 0° C.

Before use, the catalyst was reduced at temperatures rising from 150° C to 300° C by passing the hydrogen through it, thereby transforming the copper content from the oxide to the metallic form. The catalyst was then heated to 250° ± 3° C and maintained at this temperature during the entire reaction time that follows. In 6¾ hours a solution of 89 g of butanolamine in 144.8 g of 38.2% aqueous ammonia, which corresponds to a molar ratio of butanolamine to ammonia to water of 1:3.25:5, was uniformly pumped into the vaporizer-preheater heated to 250° C, from whence the vapor mixture formed therein entered directly into the reactor. Under the conditions described, the catalyst loading amounted to 0.13 g of butanolamine per g of catalyst per hour and the time of stay amounted to 6 seconds. The vapors leaving the reactor were first cooled in the initial cooling stage to 85°–100° C, the water and tetramethylpyrazine being thereby converted to the liquid form. In the second cooling stage, at about 0° C, the tetramethylpyrazine separated in the form of the crystalline hydrate. After filtration and drying, 54.8 g of only slightly yellowish 2,3,5,6-tetramethylpyrazine was obtained, corresponding to a yield of 80.6% with reference to the butanolamine put in. The reaction of the butanolamine was virtually complete, the tetramethylpyrazine contained no 2,5,6-trimethyl-3-hydroxypyridine and in the reactor no appreciable amounts of the by-product had been deposited.

EXAMPLE 2

The procedure of Example 1 was followed except that the catalyst was heated to 280° C and during the reaction time a total of 200 g of gaseous ammonia was additionally fed into the preheater. The molar ratio of butanolamine to ammonia to water amounted in the experiment to 1:15:5, and the time of stay was 3.7 seconds. 52 g of tetramethylpyrazine was isolated, corresponding to a 77% yield, with complete reaction of the starting material.

EXAMPLE 3

A solution of 117 g of 1,2-diethylmonoethanolamine (hexanolamine) in 145 g of 38% aqueous ammonia was brought to reaction at 280° C as in Example 1. 72.5 g of anhydrous 2,3,5,6-tetraethylpyrazine was obtained, corresponding to a 76% yield.

EXAMPLE 4

A solution of 115 g of 2-hydroxycyclohexylamine in 145 g of 38% aqueous ammonia is reacted in accordance with Example 3. 66 g of anhydrous octahydrophenazine is obtained, corresponding to a yield of 70%.

EXAMPLE 5

The procedure of Example 1 was followed, but a catalyst was used which contained 22 wt/% copper, 6wt/% chromium oxide and also 4 wt/% barium oxide and 0.5 wt/% sodium oxide, on silicon dioxide as the support. With a virtually complete reaction of the butanolamine, an 83% yield of tetramethylpyrazine was obtained, but also a 6% yield of trimethylhydroxy-pyridine which, as a high-melting substance that is poorly volatile in steam, had deposited in crystalline form in the reactor, especially at the cooler reactor discharge.

Alkyl-substituted piperazines and pyrazines are chemical compounds which are employed as intermediates in the preparation of rubber accelerators, condensation polymers, pharmaceuticals, dyestuffs, and the like.

What is claimed is:

1. Process for preparing 2,3,5,6-tetraalkylpyrazines having the formula

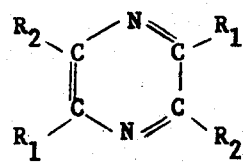

which comprises the step of cyclization by dehydrogenation and dehydration of 1,2-dialkylmonoethanolamines having the formula

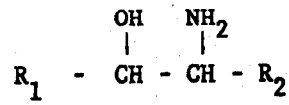

wherein $R_1$ and $R_2$ represent identical or different $C_{1-4}$ alkyl radicals on copper-chromate catalyst at temperatures of 200° to 300° C, in the presence of 1 to 20 moles of ammonia per mole of 1,2-dialkylmonoethanolamine and in the presence of 0.1 to 20 moles of water vapor per mole of 1,2-dialkylmonoethanolamine; said catalyst consisting essentially of 5–50 wt/% copper, and 1–10 wt/% chromium and aluminum oxide and/or silicon dioxide support.

2. Process of claim 1 wherein said catalyst contains 10–25 wt/% copper.

3. Process of claim 1 wherein said catalyst contains 2–5 wt/% chromium.

4. Process of claim 1 wherein the catalyst loadings are in the range of 0.1 to 0.5 grams of dialkylmonoethanolamine per gram of catalyst per hour.

* * * * *